March 2, 1965 R. HELITAS 3,171,196
METHOD OF PRODUCING A CLIP ACTION BEARING PORTION
ON A MALE ELEMENT FOR ASSEMBLY OF SAID MALE
ELEMENT WITH A FEMALE TUBULAR ELEMENT
Filed May 23, 1961
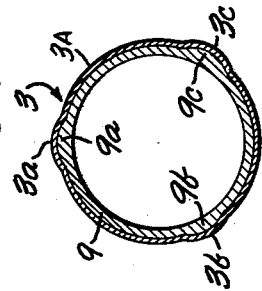
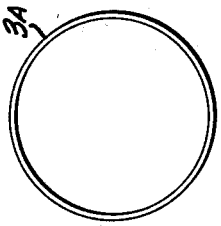
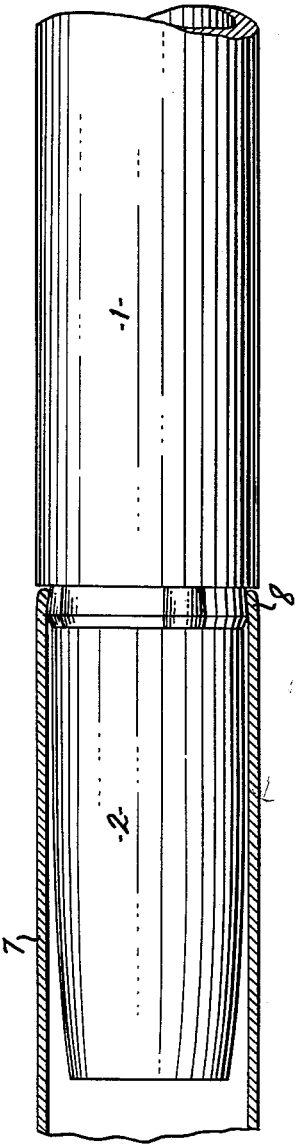
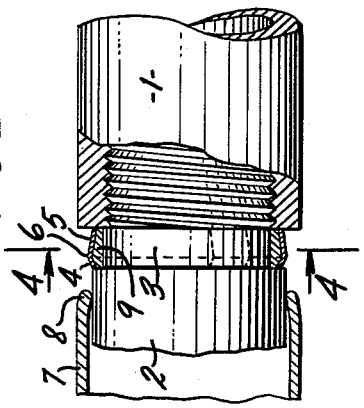

3,171,196
METHOD OF PRODUCING A CLIP ACTION BEARING PORTION ON A MALE ELEMENT FOR ASSEMBLY OF SAID MALE ELEMENT WITH A FEMALE TUBULAR ELEMENT
Robert Helitas, Asnieres, Seine, France, assignor to A. J. Fagard & Cie, Paris, France, a French body corporate
Filed May 23, 1961, Ser. No. 112,081
Claims priority, application France, June 28, 1960, 831,358, Patent 1,271,537
2 Claims. (Cl. 29—520)

The invention relates to a method of coupling in an elastically yieldable manner an elastically yieldable cylindrical tubular female element to a coaxial male element so as to produce therebetween an assembly which can be separated by a longitudinal traction.

This method is applicable in particular, but not exclusively to the closure of a pen, such as a fountain or ball-point pen, by a cap.

This method is of the type in which the elastically yieldable cylindrical tubular female element has at its fixing end a slightly restricted portion and the male element comprises a bearing portion provided with a number of radial bosses or lugs of small size in the longitudinal direction. The circle circumscribing the crests of these bosses has a diameter slightly greater than the inside diameter of the restricted portion of the female element whereby, when the bearing portion is capped by the female element by exerting a longitudinal pressure thereon, the restricted portion of the female element is deformed and then, after having passed over the ridge corresponding to the crests of the bosses, resumes its initial circular shape and thus elastically couples the two elements.

In order to facilitate entry of the male element into the female element, each of the bosses has in an axial section of the male element an oblique profile whose radius diminishes in the direction from the crest of the boss toward the end of the boss which comes into contact with the female element at the beginning of the coupling operation. This oblique profile constitutes a ramp which produces a progressive deformation of the restricted portion of the female element when coupling the elements.

Production of a metal seat constituted for example by a member having a cylindrical face provided with bosses of this type, is a delicate procedure.

In the coupling method according to the invention the bearing portion of the male element is constituted by a circular annular ring of elastically yieldable metal which is force fitted on a seat possessing radial bosses moulded in the latter. The inside diameter of the ring is substantially less than the diameter of the circle circumscribing the moulded bosses, whereby when the ring is placed in its final position on the seat the ring is deformed and bosses are created in the regions of the periphery of the ring where it is in contact with the moulded bosses.

Thus, according to the invention a metal member having bosses is produced by means of, on the one hand, an element composed of plastic material produced by a simple moulding operation and, on the other hand, a circular thin metal ring which is also very easy to produce.

The thickness of the ring and the height of the moulded bosses are such that when the ring is in position on its seat, the diameter of the circle circumscribing the crests of the bosses of the ring is slightly greater than the inside diameter of the restricted portion of the female element.

Other features and advantages of the invention will be apparent from the ensuing description, with reference to the accompanying drawing to which the invention is in no way limited.

In the drawing:

FIG. 1 is an elevation view partly in section and on an enlarged scale, of a portion of a pen and a cap capping said portion;

FIG. 2 is an elevation view partly in section and partly cut away of a portion of the pen and a portion of the cap showing the coupling elements in their uncoupled position;

FIG. 3 is an end view of the ring before mounting, and;

FIG. 4 is a sectional view taken along line 4—4 of FIG. 2.

In the embodiment shown in the drawing, the pen, such as a fountain or ball-point pen, comprises a body 1 on which is screwed an end element 2 comprising a coupling bearing portion 3. The latter has two faces 4 and 5 (FIGS. 1 and 2) with an edge or ridge 6 therebetween and is adapted to cooperate with a cap 7 of a thin elastically yieldable metal comprising at its fixing end a slightly restricted portion 8 of reduced diameter. The face 5 defines a relief portion.

The bearing portion is an end portion and comprises, on its periphery, a number of bosses or protuberances of equal height, for example three bosses, 3a, 3b, 3c (FIG. 4) extending radially outwardly from the bearing portion and disposed angularly spaced thereon. The diameter of the circle intersecting or circumscribing the crests of the bosses is slightly greater than the inside diameter of the restricted portion 8 of the cap 7.

According to an important feature of the invention said bosses are obtained from a circular ring such as the ring 3A (FIG. 3) which is composed of thin metal and is forced on a seat 9. The seat is constituted by a part of the end of element 2, and has a generally cylindrical shape and possesses moulded thereon three bosses 9a, 9b, 9c. The inside diameter of the ring 3A is slightly less than the diameter of the circle intersecting the crests of the bosses 9a, 9b, 9c of the seat 9 and greater in diameter than the seat so that when the ring 3A is placed in its final position circumferentially of the seat by forcing it axially onto the latter, the ring is deformed under the effect of the radial outward pressure exerted by the moulded bosses and assumes the shape shown in FIG. 4. In deforming the ring elastically contracts over the relief portion 5 and is fixed.

When the cap is assembled with the thus deformed ring 3A, the restricted portion 8 is first deformed and then, when it has passed over the ridge 6 of the ring, the end of the cap resumes its initial circular shape and thus remains clipped over the ring and therefore attached to the pen and its reduced diameter or restricted end portion 8 is disposed circumferentially of and in axial correspondence with the relief portion thereby holding the assembled cap in position. If a traction is exerted in the opposite direction on the cap, the reverse process ensues. Thus the invention provides a coupling device operating by means of a single clipping action and obtained by relatively simple production operation.

It must be understood that the scope of the invention is not intended to be limited to the application of the coupling device to a pen, as it is of utility whenever it is desired to couple detachably by means of an elastic clipping action a small elastically yieldable tubular element to a male element of suitable diameter in such manner that the assembly and separation of the two elements can be obtained easily and instantaneously by merely exerting respectively an axial pressure applying the two elements together and an axial traction separating said elements.

Although a specific embodiment of the invention has been described, many modifications and changes may be made therein without departing from the scope of the invention as defined in the appended claims.

Thus, the number of bosses can be other than three. This number should, however, be rather small so that the elastically yieldable ring is capable of being deformed in such manner as to adopt the contours of the moulded element on which it is mounted.

Having now described my invention, what I claim as new and desire to secure by Letters Patent is:

1. A method of producing a clip action bearing portion on a male element for assembly of said male element with a female tubular element comprising an end portion having a reduced diameter and into which said male is inserted for effecting between said male element and said female element an elastic, yieldable coupling, said method comprising, molding said male element with a body portion and a cylindrical seat on an end portion thereof insertable into said female element end portion and having angularly spaced protuberances on said seat extending radially outwardly of said seat and a circumferential surface defining a relief portion disposed between an end of said end portion of said male element and said body portion of said male element to receive said end portion of said female element of reduced diameter circumferentially of said seat with said reduced diameter in correspondence axially with said relief portion, providing a deformable ring of elastically yieldable metal having a diameter less than the diameter of a circle circumscribing said protuberances and of greater diameter than said cylindrical seat, and forcing said ring axially of said seat to deform said ring to cause it to conform to said seat and develop protuberances on said ring extending radially outwardly thereof substantially corresponding with protuberances on said seat and thereby elastically contracting said ring onto said relief portion to fix said ring on said seat.

2. A method of producing a clip action bearing portion on an end part of a body portion of a pen holder for assembly of said pen holder with a pen cap comprising an end portion having a reduced diameter and into which said pen holder is inserted for effecting with said pen holder an elastic, yieldable coupling, said method comprising, molding said end part with a cylindrical seat on an end portion thereof insertable into said female element end portion and having angularly spaced protuberances of substantially equal height on said seat extending radially outwardly of said seat and a circumferential surface defining a relief portion disposed between an end of said end portion of said end part and said body portion of said pen holder to receive said end portion of said female element of reduced diameter circumferentially of said seat with said reduced diameter in correspondence axially with said relief portion, providing a deformable ring of elastically yieldable metal having a diameter less than the diameter of a circle circumscribing said protuberances and of greater diameter than said cylindrical seat, and forcing said ring axially of said seat to deform said ring to cause it to conform to said seat and develop protuberances on said ring extending radially outwardly thereof substantially corresponding with protuberances on said seat and thereby elastically contracting said ring onto said relief portion to fix said ring on said seat.

References Cited by the Examiner
UNITED STATES PATENTS

| | | | |
|---|---|---|---|
| 589,216 | 8/97 | McKee | 285—239 |
| 784,566 | 3/05 | Hoskins | 285—332 |
| 787,154 | 4/05 | Delehant | 285—332 |
| 962,298 | 6/10 | Babbitt | 285—424 |
| 1,291,388 | 1/19 | Bright et al. | |
| 2,197,883 | 4/40 | Sinclair. | |
| 2,200,583 | 5/40 | Shepard | 29—525 |
| 2,559,555 | 7/51 | Zepelovitch | 120—42.01 |
| 2,636,254 | 4/53 | Gunning | 29—525 |
| 2,782,762 | 2/57 | Young | 120—42.01 |
| 2,817,189 | 12/57 | Esmay. | |

FOREIGN PATENTS 22,077   9/10   Great Britain.

WHITMORE A. WILTZ, *Primary Examiner.*
CARL W. TOMLIN, *Exaxminer.*